United States Patent
Ichapurapu et al.

(10) Patent No.: US 11,570,632 B1
(45) Date of Patent: Jan. 31, 2023

(54) ALGORITHM FOR IMPROVING ZIGBEE RELIABILITY AND LATENCY IN A MULTI-RADIO SYSTEM

(71) Applicant: Amazon Technologies, Inc., Seattle, WA (US)

(72) Inventors: Ravi Ichapurapu, Morgan Hill, CA (US); Morris Yuanhsiang Hsu, Sunnyvale, CA (US); Milos Jorgovanovic, Mountain View, CA (US); Pratik Kalpesh Patel, Sunnyvale, CA (US)

(73) Assignee: Amazon Technologies, Inc., Seattle, WA (US)

(*) Notice: Subject to any disclaimer, the term of this patent is extended or adjusted under 35 U.S.C. 154(b) by 394 days.

(21) Appl. No.: 15/926,778

(22) Filed: Mar. 20, 2018

(51) Int. Cl.
*H04W 84/12* (2009.01)
*H04W 84/18* (2009.01)
*H04W 80/04* (2009.01)
*H04W 8/26* (2009.01)
*H04W 88/06* (2009.01)
*H04W 24/02* (2009.01)
*H04W 4/80* (2018.01)

(52) U.S. Cl.
CPC .............. *H04W 24/02* (2013.01); *H04W 4/80* (2018.02); *H04W 84/12* (2013.01)

(58) Field of Classification Search
CPC ..... H04W 84/12; H04W 84/18; H04W 80/04; H04W 8/26; H04W 88/06
USPC ......................................................... 370/338
See application file for complete search history.

(56) References Cited

U.S. PATENT DOCUMENTS 5,568,469 A * 10/1996 Sherer ................. H04L 12/4015
370/238
7,028,298 B1 * 4/2006 Foote .................... G06F 9/5016
718/104

(Continued)

OTHER PUBLICATIONS

Duty Cycles of Wireless Applications and Activities for WiFi Exposure Assessment, Wout Joseph et al., , 2013 (Jan. 2013), Department of Information Technology, Ghent University, Ghent, Belgium. (Year: 2013).*

(Continued)

*Primary Examiner* — Peter G Solinsky
*Assistant Examiner* — Sanjay K Dewan
(74) *Attorney, Agent, or Firm* — Kilpatrick Townsend & Stockton LLP

(57) ABSTRACT

A computer-implemented method includes receiving, from an application framework, a set of tasks, a throughput requirement for each task of the set of tasks, and a set of active connections for a radio network comprising a Wi-Fi radio and a Zigbee radio. The computer-implemented method also includes determining, using the set of tasks, the throughput requirement for each task of the set of tasks, and the set of active connections, a target Wi-Fi radio duty cycle and setting the Wi-Fi radio to operate at the target Wi-Fi radio duty cycle. The computer-implemented method further includes monitoring, using a monitoring unit, air time statistics associated with the Wi-Fi radio, determining, using the air time statistics, a measured Wi-Fi duty cycle, and adjusting Wi-Fi radio settings to decrease a difference between the target Wi-Fi duty cycle and the measured Wi-Fi duty cycle.

20 Claims, 9 Drawing Sheets

(56) References Cited

U.S. PATENT DOCUMENTS

| | | | | |
|---|---|---|---|---|
| 7,454,171 B2* | 11/2008 | Palin | ................... | H04L 1/1887 |
| | | | | 370/328 |
| 7,636,340 B2* | 12/2009 | Black | ................... | G01D 21/00 |
| | | | | 348/158 |
| 7,711,373 B2* | 5/2010 | Kasslin | ................ | H04B 1/406 |
| | | | | 370/310 |
| 10,142,821 B2* | 11/2018 | Kim | ..................... | H04W 16/14 |
| 10,219,202 B1* | 2/2019 | Malasani | .............. | H04W 24/02 |
| 2004/0131035 A1* | 7/2004 | Wakeley | .............. | H04W 88/02 |
| | | | | 370/338 |
| 2007/0263709 A1* | 11/2007 | Kasslin | ................ | H04W 88/06 |
| | | | | 375/222 |
| 2008/0215689 A1* | 9/2008 | Pietila | .................... | H04L 67/14 |
| | | | | 709/206 |
| 2010/0061326 A1* | 3/2010 | Lee | ...................... | H04W 88/06 |
| | | | | 370/329 |
| 2010/0182986 A1* | 7/2010 | Okuike | ............... | H04W 56/00 |
| | | | | 370/338 |
| 2013/0178160 A1* | 7/2013 | Wang | ................... | H04W 48/10 |
| | | | | 455/41.2 |
| 2013/0178163 A1* | 7/2013 | Wang | ................... | H04W 48/10 |
| | | | | 455/41.2 |
| 2014/0286211 A1* | 9/2014 | Hiremath | ............... | H04W 4/80 |
| | | | | 370/311 |
| 2016/0165387 A1* | 6/2016 | Nhu | ....................... | H04L 67/10 |
| | | | | 455/41.1 |
| 2016/0269971 A1* | 9/2016 | Kim | ...................... | H04W 16/14 |
| 2017/0077744 A1* | 3/2017 | Kim | ....................... | H02J 7/042 |
| 2017/0105176 A1* | 4/2017 | Finnegan | ........... | H04W 52/0229 |
| 2017/0188181 A1* | 6/2017 | Jin | .................... | H04W 72/1215 |
| 2019/0132396 A1* | 5/2019 | Finnegan | ............. | H04L 67/125 |
| 2019/0215369 A1* | 7/2019 | Pry | ........................ | H04L 67/12 |
| 2019/0364492 A1* | 11/2019 | Azizi | ................... | H04W 4/029 |
| 2020/0149770 A1* | 5/2020 | Sinha | ....................... | F24F 11/64 |
| 2020/0248550 A1* | 8/2020 | Theunissen | ............. | E21C 35/24 |

OTHER PUBLICATIONS

Golmie et al., The Evolution of Wireless LANs and PANS, Bluetooth and WLAN Coexistence: Challenges and Solutions, IEEE Wireless Communications, Dec. 2003.*

Khurram et al. (A comparative study of In-sensor Processing vs. raw data transmission using Zigbee, Ble and WiFi for data intensive monitoring applications, 2014) (Year: 2014).*

* cited by examiner

ALGORITHM FOR IMPROVING ZIGBEE RELIABILITY AND LATENCY IN A MULTI-RADIO SYSTEM

BACKGROUND

With the advancement of technology, the use and popularity of electronic devices has increased considerably. Electronic devices are commonly used to capture, process, and transmit image and audio data.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some home automation systems, multiple radio networks (Wi-Fi, Bluetooth, and Zigbee), which share radio resources, are utilized to provide a Smart Home experience. As an example, a Home Automation Hub could be tasked with turning lights ON when a door sensor is triggered by a door being opened. This operation could be performed while the Home Automation Hub is also streaming multimedia content, receiving video from a camera, or the like. The Home Automation Hub will typically have performance guidelines for each of the radio resources. Preferably, the communication of ZigBee packets is reliable and has a low latency, which will enable the transmission and reception of notifications and instructions at levels that comply with desired levels of system performance.

However, because multiple radio networks share common radio resources, for example, a frequency band, competition between the various radio networks for the common radio resources can result in Zigbee packets that are dropped or require retransmission. As an example, if a system is streaming multimedia content to a wireless speaker, the Wi-Fi radio may be using significant bandwidth to receive and transmit the content. Concurrently, since asynchronous monitoring can be performed using Zigbee sensors, if the proper radio resources are not available, for example, due to the bandwidth consumed by multimedia streaming, when the Zigbee sensor is activated, Zigbee packets may not be received in a timely manner, preventing the asynchronous monitoring operation from performing properly.

Embodiments of the present disclosure address the issues presented by the asynchronous nature of the Zigbee packets. In particular, ZigBee reliability and latency are ensured by controlling the duty cycle of the various radios such that they coexist in a manner that meets system requirements. In addition to ensuring Zigbee reliability, embodiments of the present disclosure optimize the performance of the Wi-Fi and Bluetooth radios in a manner that can be extended to any multi-radio systems.

Figure 1:
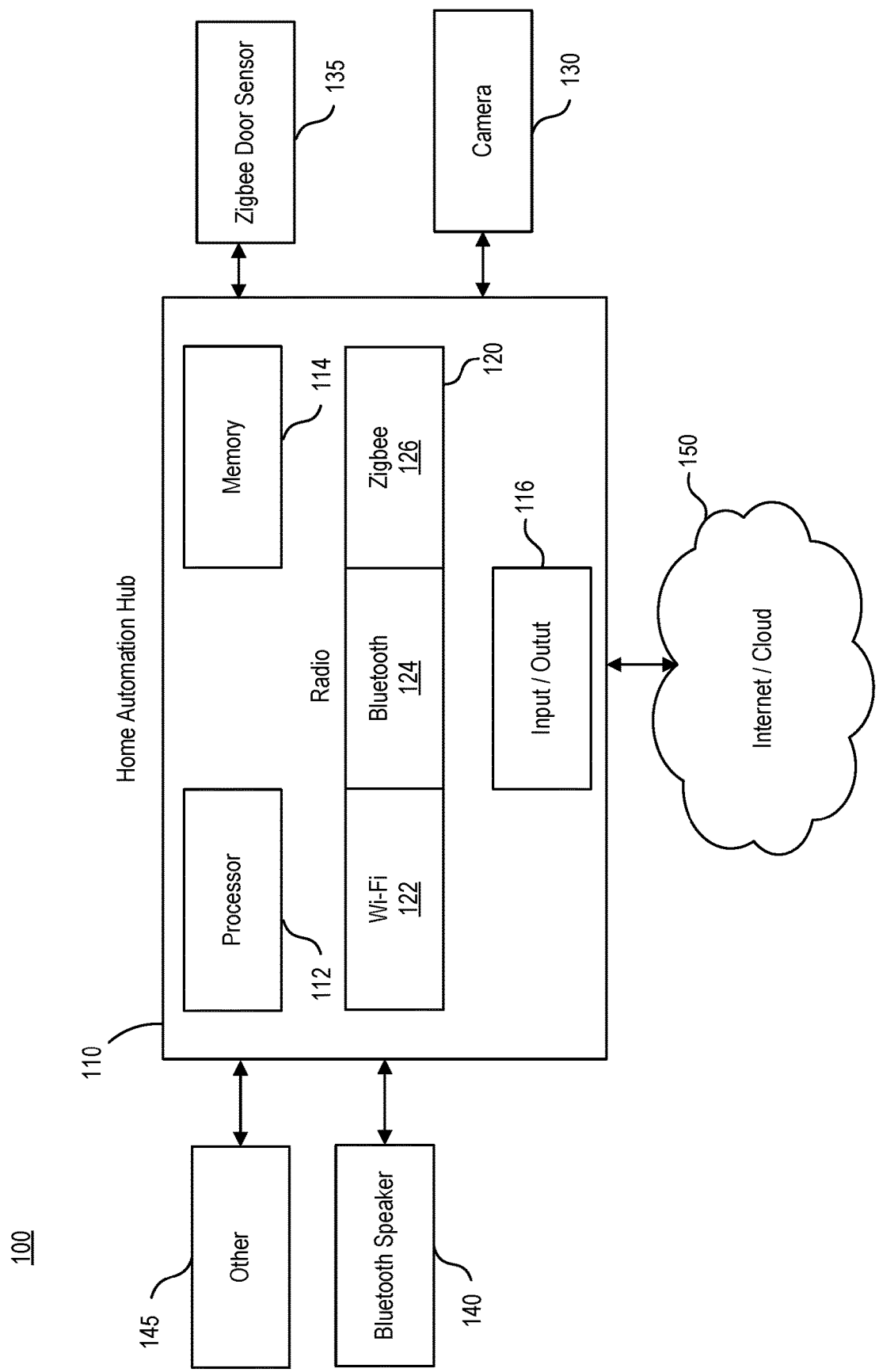
FIG. 1 illustrates a home automation environment according to examples of the present disclosure.

FIG. 1 illustrates a home automation environment according to examples of the present disclosure. As illustrated in FIG. 1, the home automation environment 100 includes a home automation hub 110 that includes a processor 112, memory 114, also referred to as a non-transitory computer-readable storage medium (i.e., storage media), and an input/output 116. Computer-readable instructions can be stored on the non-transitory computer-readable storage medium coupled to the processor. The plurality of computer-readable instructions tangibly embodied on the computer-readable storage medium can be executed by the processor to perform one or more of the methods described herein. Additionally, the home automation hub 110 includes a plurality of radios, illustrated by Wi-Fi radio 122, Bluetooth radio 124, and Zigbee radio 120. It will be appreciated that although "home" automation is discussed herein, embodiments of the present disclosure are not limited to a home, but can be utilized in a variety of applications in which automation of electronics including speakers, audio-visual equipment, sensors, and the like is provided.

Additionally, although three radio networks are illustrated in FIG. 1, other radio protocols and networks can be utilized according to embodiments of the present disclosure. Moreover, although three radios are illustrated in FIG. 1, a larger or smaller number of radios can be utilized as appropriate to the particular application.

The home automation hub 110 communicates with a variety of electronic devices using the Wi-Fi radio 122, the Bluetooth radio 124, or the Zigbee radio 120. For instance, FIG. 1 illustrates several electronic devices that can communicate with the home automation hub, including a camera 130, which can communicate through Wi-Fi, a Zigbee door sensor 135, a Bluetooth speaker 140, or other (145) electronic devices. The home automation hub 110 is in communication with the internet/cloud 150 as described more fully herein. Communication with the internet/cloud 150 can be performed by an Ethernet connection, a Wi-Fi connection, or other suitable communication protocol.

Storage media or computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

As described herein, embodiments of the present disclosure control the duty cycle of the various radios, e.g., Wi-Fi radio 122, Bluetooth radio 124, and Zigbee radio 126 such that they coexist in the environment, managing the radio resources to prevent interference with other radios while fulfilling the tasks accomplished by each radio in compliance with system requirements.

Figure 2:
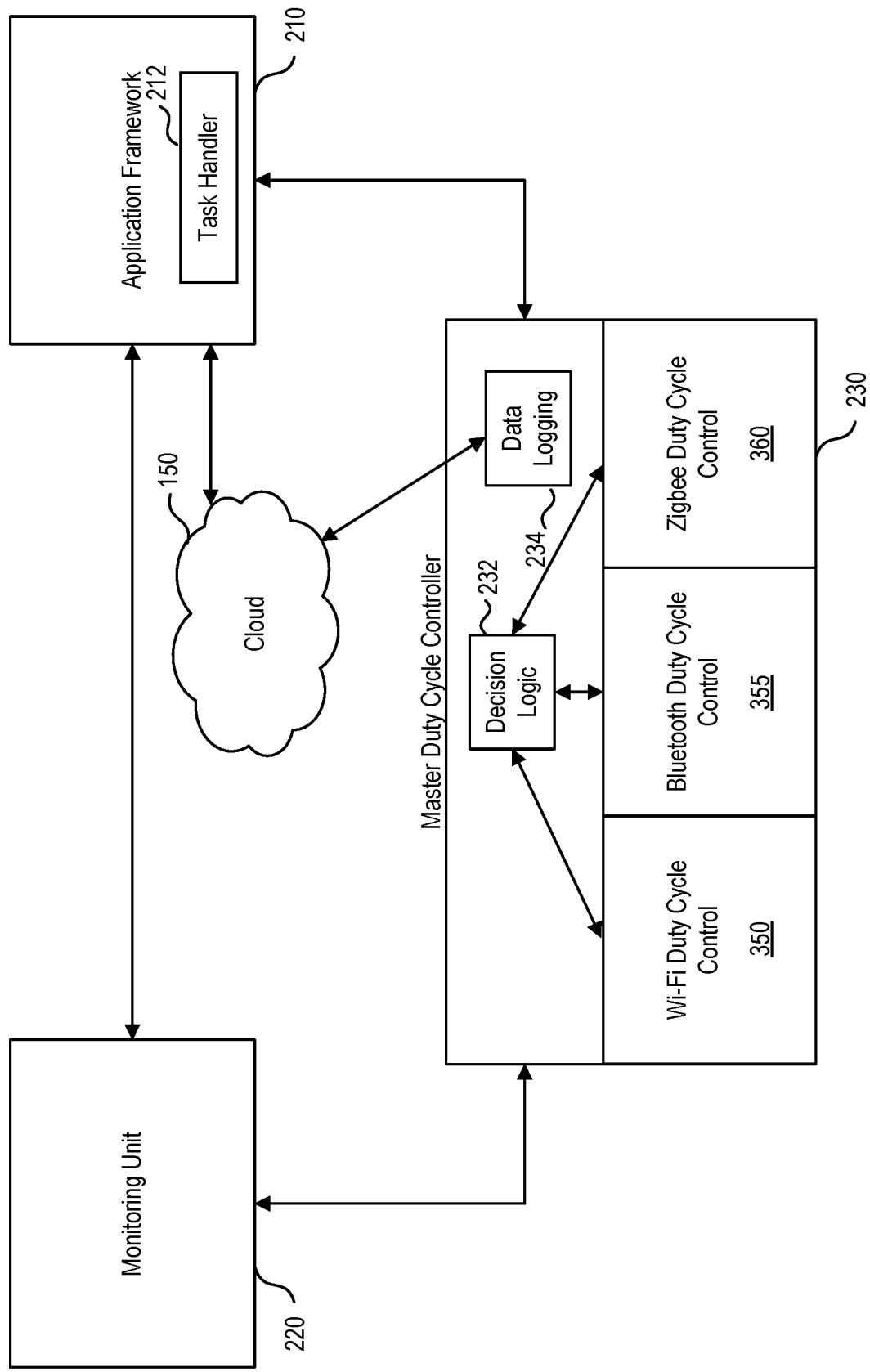
FIG. 2 illustrates a system for controlling multiple radios in a home automation environment according to examples of the present disclosure.

FIG. 2 illustrates a system for controlling multiple radios in a home automation environment according to examples of the present disclosure. At a high level, the home automation process utilizes three elements: application framework 210, monitoring unit 220, and master duty cycle controller 230. The application framework 210 maintains information on the tasks being performed (also referred to as existing tasks) and the active connections in the system. The monitoring block 230 collects information from all of the radios, including information on throughput and link quality. The master duty cycle controller 230 receives inputs from the application framework 210 and the monitoring unit 220 and includes decision logic 232 to determine the appropriate duty cycle for each radio and to implement duty cycle control for each radio, which can also be referred to as mitigation. The master duty cycle controller 230 operates in a manner that ensures that the various radios respond to changes in the status of the environment, for example, the addition of a new connection, change in task type or throughput requirement, and the like.

As described more fully herein, the duty cycles of the various radios are controlled so that each of the radios is able to coexist and communicate as needed to meet the system requirements. The application framework 210 and the monitoring unit 220 run on the home automation hub and interact to provide inputs for the master duty cycle controller 230. Accordingly, the home automation hub has access to data on the current tasks and priorities, the status of each radio, and the desired performance targets. As described herein, concurrent control of the radio duty cycles enables the system to meet the desired performance targets.

The application framework 210 interacts with the monitoring unit 220 and the master duty cycle controller 230. The application framework 210 includes a task handler 212, which maintains a list of current tasks, priorities for each task, a list of current active connections, and the throughput requirements associated with each of the current active connections. The task handler runs in a loop, updating the list of current tasks, priorities, active connections, and throughput requirements as new tasks enter the application framework and are added to the existing tasks, tasks exit the application framework, and the like. The application framework can be connected to the cloud 150, which can store information on the system environment, for example, the list of current tasks and priorities, as well as provide resources for machine learning algorithms. An active connection can be present for a device (e.g., a Zigbee sensor) and a task can then be assigned to the device.

As an example, Table 1 provides an exemplary, but not complete, list of tasks that can be maintained by the application framework. These exemplary tasks include audio playback using a Bluetooth speaker, control of a light bulb using a Zigbee connection, streaming of content through the home automation hub, for example, including Wi-Fi packets used for queries, Wi-Fi packets providing notifications from the cloud, or the like, control of a Bluetooth remote, which can be paired with the home automation hub to extend the range of the home automation hub, a Zigbee sensor service, streaming for updating of firmware, distribution of audio content through Wi-Fi, and use of a Bluetooth headset to receive calls. As stated above, this list is merely exemplary of tasks that can be maintained by the application framework and it not intended to limit the type or number of tasks, which can include paring of speakers, streaming of music from the cloud, streaming of music from a smart phone, multiple active Zigbee connections, and the like. The list of current active connections is dynamically updated as link conditions vary, tasks are added or removed, and priorities are modified. Additionally, additional granularity for the tasks can be provided as appropriate. For example, for the Zigbee sensor service, this task could be specified at a more specific level, for instance, the type of Zigbee sensor (door or window sensor, water leak sensor, or the like).

TABLE 1

| Task | Priority | Required Throughput Rate (kbps) |
|---|---|---|
| BT Audio Playback | 4 | 320 |
| ZigBee Control of Lightbulb | 2 | 10 |
| Wi-Fi Packets for Alexa | 5 | 500 |
| Bluetooth Remote | 3 | 25 |
| ZigBee Sensor Service | 1 | 10 |
| Wi-Fi Packets for FW Update | 7 | 1000 |
| Wi-Fi Packets for Audio distribution | 6 | 2000 |
| BT Headset Profile for calls | 3 | 128 |

For each task, the application framework maintains a priority indicator. In Table 1, the priority indicators range from 1 (highest priority) to 7 (lowest priority), but other ranges can be utilized as appropriate to the particular implementation. As illustrated in Table 1, although multiple Bluetooth tasks can be operating concurrently, each can have different priorities. Accordingly, priorities can be different or the same, not only for different radios, but for different tasks. As an example, if Zigbee tasks are present for a door sensor and lightbulb control, the priority for the task associated with the door sensor can be assigned a higher priority than the task associated with control of the lightbulb. If multiple tasks have the same priority, arbitration between these tasks can be performed at the category level (e.g., Zigbee control tasks, audio distribution tasks, or the like), with each of the categories having a pre-assigned priority), the sensor/device level, the task level, or the like. As an example, at the category level, different categories of tasks (e.g., Zigbee control tasks, audio distribution tasks, or the like) can each have a pre-assigned priority.

The priority indicator can be used to define processes as either foreground processes, which need to be maintained, or background processes, which can be operated intermittently or in a low bandwidth manner, for example, just keeping the connection alive, but not transmitting data.

According to embodiments of the present disclosure, the list of current active connections changes as a function of time. As a result, the present disclosure operates in a dynamic manner, updating the list of active connections and modifying the radio duty cycles on a continual basis as new tasks enter the framework and/or exit the framework. As time proceeds, the duty cycles are set, e.g., optimized, at the appropriate levels as a function of the list of current active connections, which is updated as a function of time. In an implementation, the dynamic process can be performed at predetermined time intervals, e.g., 100 ms. Accordingly, the term continual includes discrete processes that are implemented at predetermined time intervals. The dynamic implementation provided by embodiments of the present disclosure contrasts with conventional methods in which the radio duty cycles are set at an initial level, but not updated as system conditions vary, including the addition or removal of tasks.

Figure 3:
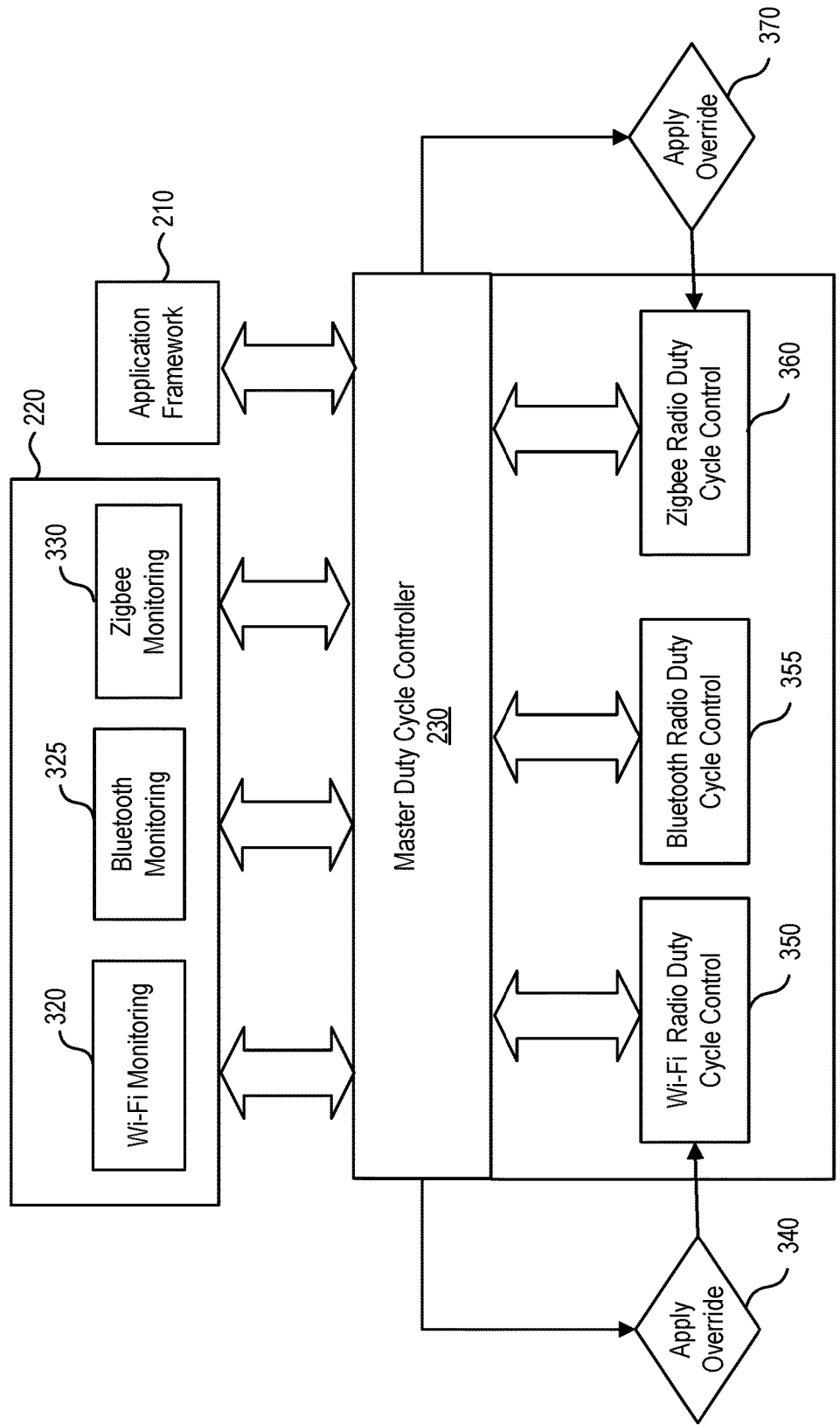
FIG. 3 illustrates operation of a master duty cycle controller according to examples of the present disclosure.

Monitoring unit 220, which is described in additional detail in relation to FIG. 3, performs monitoring of the various radio networks. The monitoring unit 220 monitors link-level quality metrics (also referred to as metrics) for the various radios. In a manner similar to the task handler 212, the monitoring unit 220 runs in a loop, updating the Wi-Fi radio metrics associated with the Wi-Fi radio (discussed in relation to monitoring block 320), Bluetooth radio metrics associated with the Bluetooth radio (discussed in relation to Bluetooth monitoring block 325), and Zigbee radio metrics associated with the Zigbee radio (discussed in relation to Zigbee monitoring block 330). The decision logic 232 receives inputs from the task handler 212 and the monitoring unit 220 and utilizes these inputs to determine control that needs to be implemented in the form of Wi-Fi duty cycle control, Bluetooth duty cycle control, Zigbee duty cycle control, and/or combinations thereof. In one implementation, a hierarchy of control is implemented with Wi-Fi duty cycle control implemented first to achieve the desired system performance metrics. Achieving or meeting desired system performance metrics can be understood as having at least one of the one or more link-level quality metrics not being compliant with at least one of a predetermined value or a range of predetermined values. If, in a predetermined time period (e.g., 100 ms), the performance metrics are not met, Zigbee duty cycle control is implemented in conjunction with Wi-Fi duty cycle control. The hierarchy can prioritize any radio as a first, second, and third choice as appropriate to the particular application. In another implementation, if the throughput requirements cannot be met with sufficient margin by only implementing Wi-Fi duty cycle control, the hierarchy could provide for modification of the duty cycles in parallel, for example, initial modification of Wi-Fi and Zigbee duty cycles followed by modification of the Bluetooth scheduling as needed. Of course, the order and combinations can be changed as appropriate to the particular application. In a manner similar to the characterization of use cases to determine the Wi-Fi duty cycle as a function of data rate and case represented by Table 2 and discussed below, characterization of use cases can be performed to provide inputs for the decision logic. For a given set of current tasks and priorities, the decision logic could then initiate duty cycle control of one or more radios, with given radio settings, in order to achieve the desired system performance metrics. As a particular example, historical data could be utilized by the decision logic for a use case in which previous experience demonstrated that for a given set of tasks and priorities, control of the Wi-Fi duty cycle alone did not achieve the desired system performance metrics. Accordingly, for this given set of tasks and priorities, control of both Wi-Fi and Zigbee duty cycle should be initiated to achieve the system performance metrics.

As another example of the decision logic, a timer can be used to trigger an output of data from the task handler and the monitoring unit. Using this data, the decision logic analyzes the current tasks and priorities in view of the radio metrics and initiates duty cycle control. In other embodiments, triggers other than a timer can be utilized to initiate action by the decision logic and the resulting duty cycle control.

The master duty cycle controller 230 enables control of the duty cycle of one or more (including all) radios as described herein. In particular, the master duty cycle controller 230 implements Wi-Fi duty cycle control 350, Bluetooth duty cycle control 355, and/or Zigbee duty cycle control 360 as described more fully in relation to FIG. 3.

Data logging 234 can be implemented as an element of the master duty cycle controller 230 to store data related to the system environment and radio settings that achieved the desired performance outcomes. In a specific example, the list of current tasks and priorities can be stored in conjunction with the decision produced by the decision logic, the radio settings for the various radios (e.g., the packet aggregation and/or packet length for a Wi-Fi radio), and optionally, a measure of the effectiveness of the radio settings in achieving the desired system performance metrics, for instance, the time associated with convergence to the desired duty cycle.

FIG. 3 illustrates operation of a master duty cycle controller according to examples of the present disclosure. The schematic diagram shown in FIG. 3 illustrates how the home automation hub illustrated in FIG. 1 performs duty cycle control under the direction of the master duty cycle controller 230. The description for elements common to FIG. 2 is applicable to FIG. 3 as appropriate. Duty cycle control is implemented using the application framework 210, the monitoring unit 220, and the master duty cycle controller 203, which includes, in this example, Wi-Fi duty cycle control 350, Bluetooth duty cycle control 355, and Zigbee duty cycle control 360.

The link-level quality metrics monitored by monitoring unit 220 can include monitoring by a Wi-Fi monitoring block 320, a Bluetooth monitoring block 325, and a Zigbee monitoring block 330. As examples, the Wi-Fi monitoring block 320 can monitor average sustained transmit (TX) throughput or data rate, average sustained receive (RX) throughput or data rate, transmit physical layer (PHY) rate, receive PHY rate, active transmit percent of air time, active receive percent of air time, transmit opportunity because of other radios in the vicinity, ping latency to estimate time required to talk to other network devices, packet error rate (PER) and the like. The Bluetooth monitoring block 325 can monitor PER, number and type of active Bluetooth links, and the like. The Zigbee monitoring block 330 can monitor Application support sub-layer (APS) failures, APS retries, mean latency, maximum latency, MAC layer and network layer retries, number of PTA requests and grants, and the like. As described herein, the link-level metrics monitored by the monitoring unit are utilized to determine that the system performance is not meeting requirements and adjust the radio duty cycles so that system performance goals are met.

As an example, for audio streaming, if buffer underrun occurs, audio stutter will result when streaming begins. In some implementations, application level audio buffers can be monitored. In other implementations, the link-level quality metrics can be used to supplement or replace the application level buffer monitoring. For instance, by monitoring the average sustained receive throughput and determining that the throughput is acceptable, a determination can be made that the audio buffer should not underrun. On the contrary, if the average sustained receive throughput is lower than a predetermined value associated with audio streaming, then a determination can be made that the audio buffer may underrun and that the Wi-Fi radio duty cycle should be adjusted. Thus, the implementations described herein can utilize the link-level quality metrics or other metrics determined using the link-level quality metrics. As an example, an effective Wi-Fi downlink throughput can be calculated as a product of the active receive percent of air time, the receive PHY rate, and the quantity (1-PER) and compared to a target throughput. Similarly, for Zigbee performance, the PTA requests and grants can be used to determine air time. For Bluetooth, the number and type of active Bluetooth links can be used to determine air time. Thus, methods for monitoring air time are provided for all radio types.

The monitoring unit 220 provides data that can be analyzed to determine the level of radio resources that each radio requires to meet performance guidelines. For example, for Zigbee, monitoring can be used to provide inputs to an analysis of the minimum airtime the Zigbee radio needs to sustain the Zigbee connection.

The monitoring unit 220, using the Wi-Fi monitoring block 320, the Bluetooth monitoring block 325, and the Zigbee monitoring block 330, monitors the active connections along with the requirements of the connections. Although the Wi-Fi monitoring block 320, the Bluetooth monitoring block 325, and the Zigbee monitoring block 330 are illustrated as elements of monitoring unit 220, it will be appreciated that these monitoring blocks can be implemented on the corresponding radio unit, for example, the Wi-Fi monitoring block 320 can be implemented through software logging on the Wi-Fi radio chip. Thus, FIG. 3 represents the monitoring process in schematic form.

The decision logic 232 included in the master duty cycle controller 230 as illustrated in FIG. 2 is in communication with the Wi-Fi radio duty cycle control unit 350, Bluetooth radio duty cycle control unit 350, and Zigbee radio duty cycle control unit 350. Since all three radios have specific tasks, the master duty cycle controller sets the duty cycles for one or more of the various radios to enable the specific tasks to be performed in accordance with the system performance requirements.

Figure 5:
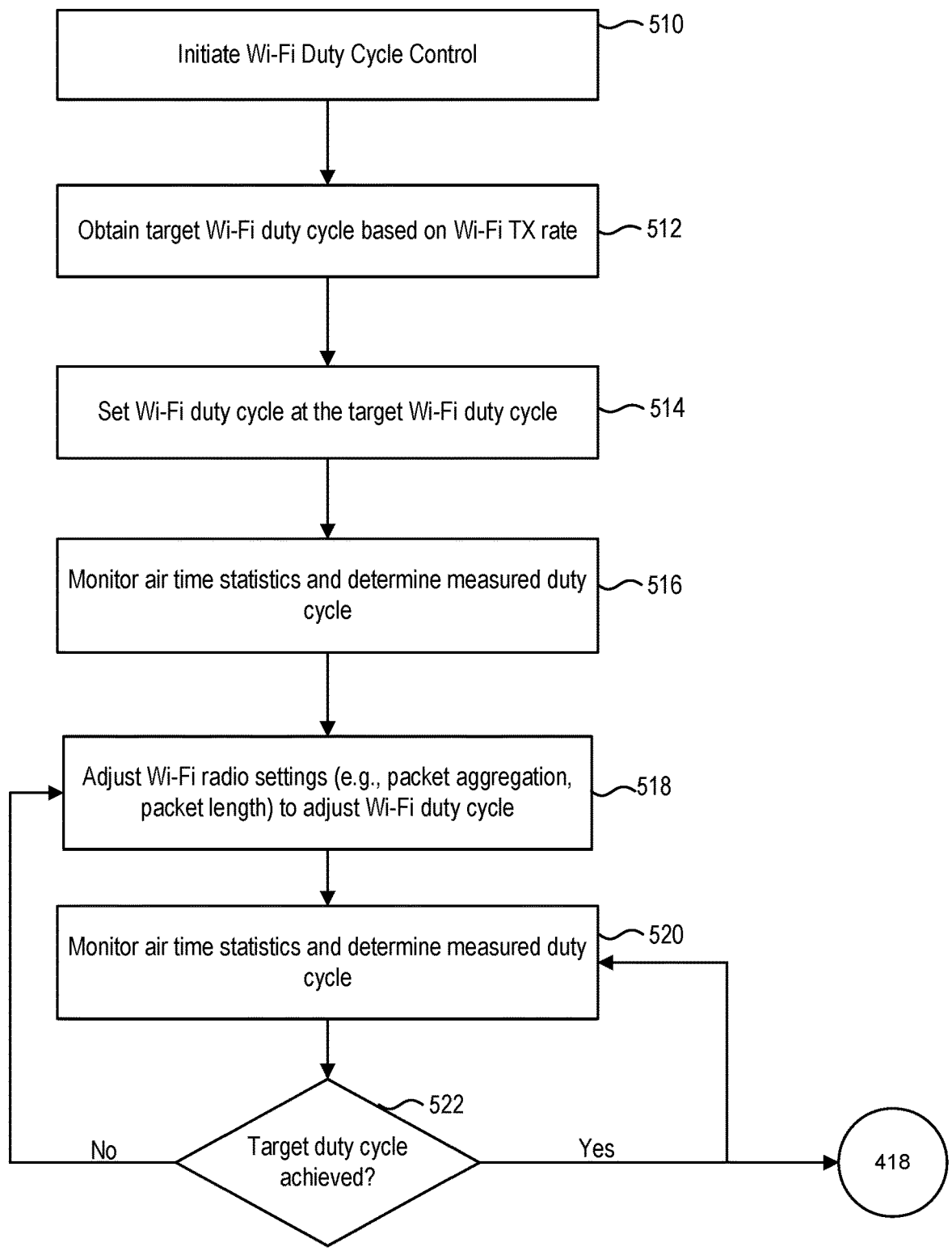
FIG. 5 is a flowchart conceptually illustrating a method of controlling a Wi-Fi radio duty cycle according to examples of the present disclosure.

As described herein, in some situations, it may be desirable to set the Wi-Fi radio duty cycle at a given level without initiating the Wi-Fi duty cycle control process illustrated in FIG. 5. Accordingly, the master duty cycle controller can apply an override (340) to the Wi-Fi radio duty cycle as illustrated in FIG. 3. Moreover, in some implementations, the number of Zigbee requests that are granted can be adjusted to maintain system performance at desired levels. Accordingly, the master duty cycle controller can apply an override (370) to the Zigbee radio duty cycle as illustrated in FIG. 3.

Figure 7:
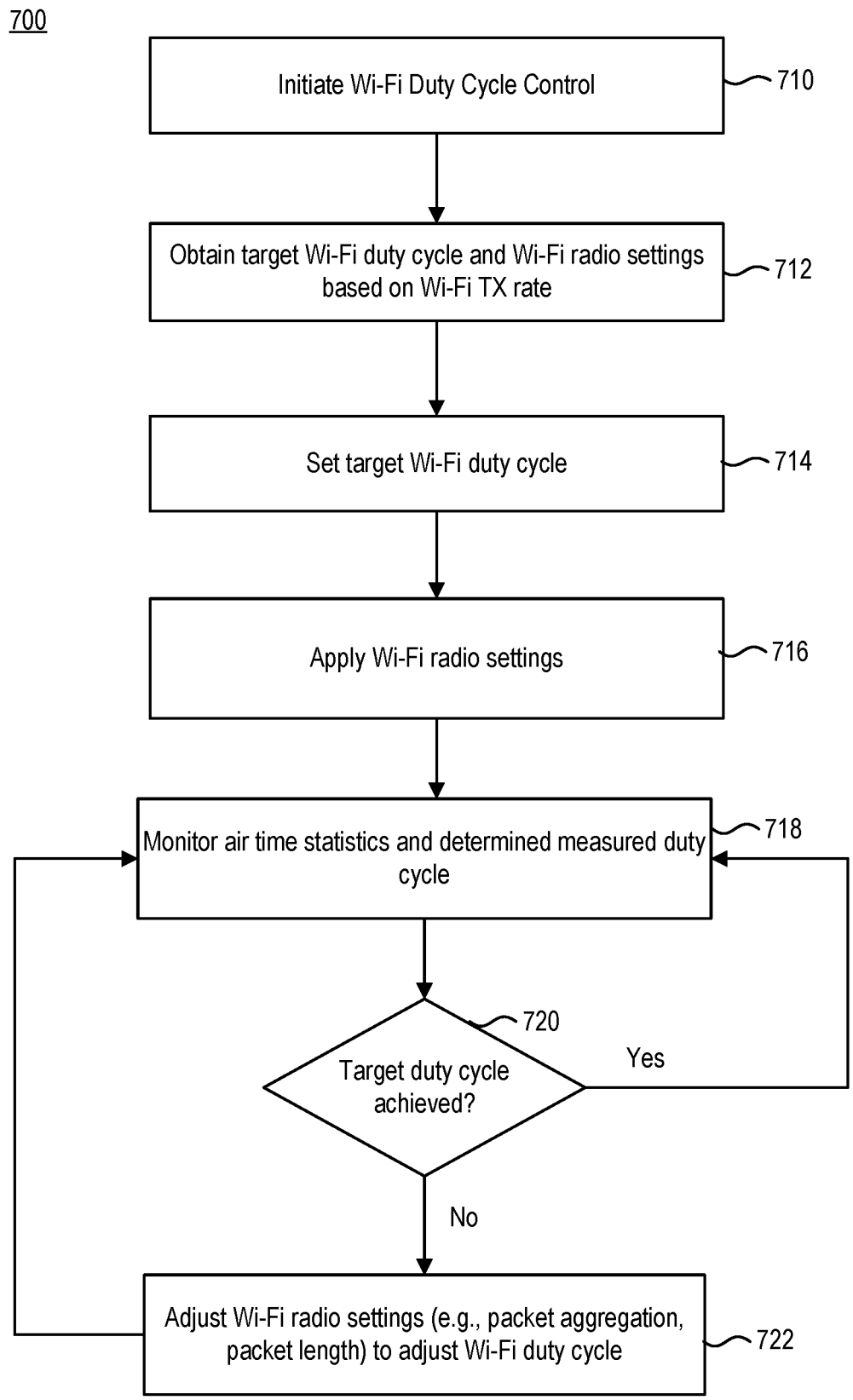
FIG. 7 is a flowchart conceptually illustrating a method of controlling a Wi-Fi radio duty cycle according to another example of the present disclosure.
Figure 8:
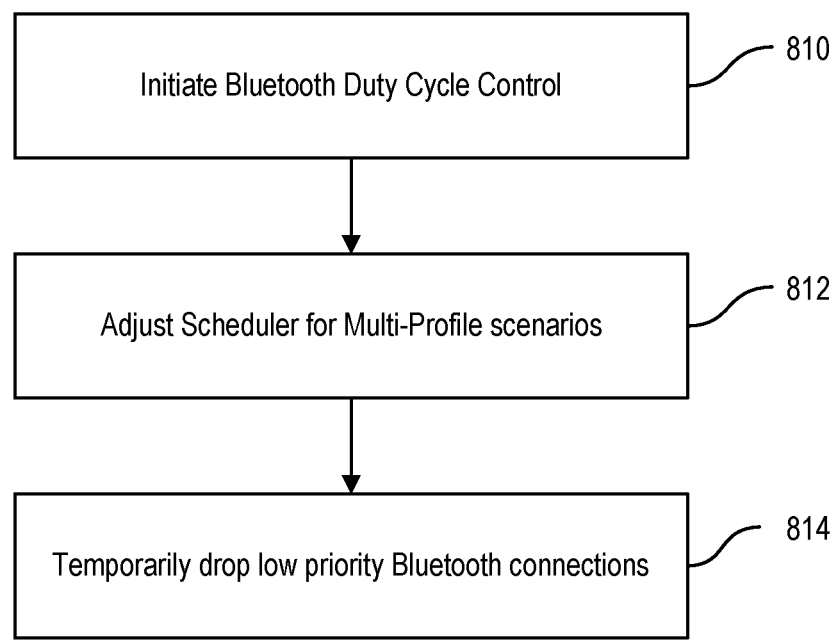
FIG. 8 is a flowchart conceptually illustrating a method of controlling Bluetooth radio duty cycle according to examples of the present disclosure.

Although Wi-Fi duty cycle control is utilized frequently, the master duty cycle controller may utilize control of Wi-Fi duty cycle in conjunction with control of the duty cycle of one or more of the other radios. Accordingly, the duty cycle control methods illustrated in FIG. 5 or 7, 8, and 9 can be utilized concurrently. Typically, in these concurrent control scenarios, Wi-Fi duty cycle and Zigbee duty cycle are controlled concurrently since Bluetooth is a schedule-based standard, which provides a limited range of control. As an example, while Wi-Fi duty cycle control is implemented as discussed in relation to FIGS. 5 and 7, Zigbee traffic could be restricted to a predetermined packet rate as illustrated in FIG. 8. Moreover, duty cycle control can be implemented individually (Wi-Fi, Bluetooth, or Zigbee) or in any combination (Wi-Fi and Bluetooth, Wi-Fi and Zigbee, Bluetooth and Zigbee, or Wi-Fi and Bluetooth and Zigbee).

The ability to apply an override for the Wi-Fi radio (340) and the Zigbee radio (370) provides functionality to set duty cycles, not based on the methods illustrated in FIG. 5 or 7, 8, and 9, but based on specific values determined by the master duty cycle controller. Additional description related to the application of overrides is provided in relation to FIG. 4.

Figure 4:
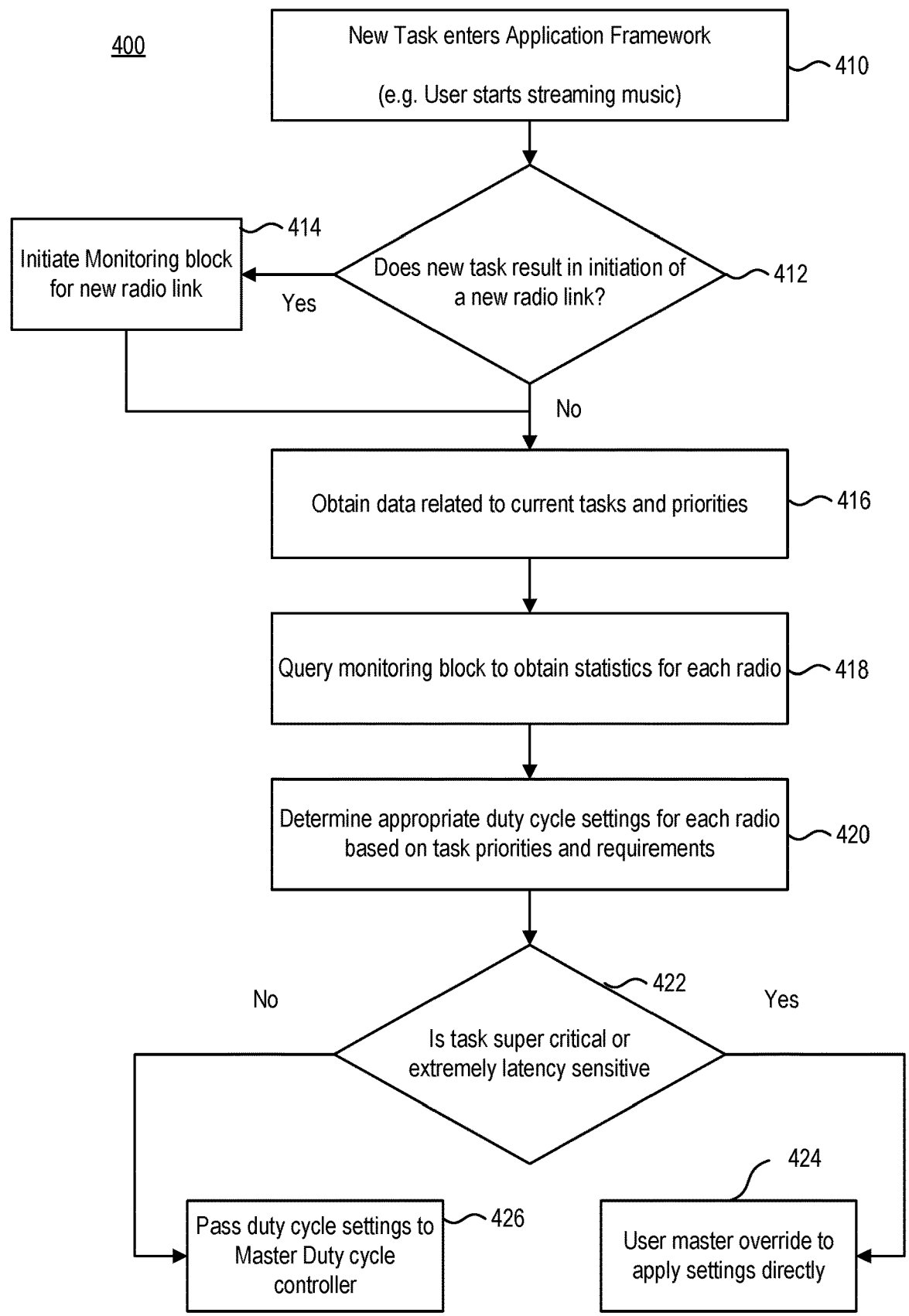
FIG. 4 is a flowchart conceptually illustrating a method of controlling duty cycle settings according to examples of the present disclosure.

FIG. 4 is a flowchart conceptually illustrating a method of controlling duty cycle settings according to examples of the present disclosure. The method 400 includes the entry of a new task into the application framework (410) as a new service is initiated. Entry of the new task is processed by task handler 212. As an example, a user may start streaming music. In this example, the request to stream music results in publication of an intent at the OS level. The task handler subscribes to and detects the intent associated with the spawning of the new task. A determination is made by the task handler of whether the new task results in the initiation of a new radio link (412), also referred to as a new active connection. For instance, a new Bluetooth link to a speaker could be initiated. For Zigbee devices, a new device could be added to the network, resulting in a new Zigbee active connection being initiated. If a new radio link is initiated, the method initiates a monitoring block for the new radio link (414). The new monitoring block can be added to the other monitoring blocks that are elements of monitoring unit 220.

After initiation of the monitoring block as appropriate, the method includes obtaining data related to the current tasks, active connections, priorities, and throughput requirements (416) as illustrated in Table 1. This data can be obtained by the task handler, either as the new task enters the framework or on a periodic basis. The data relates to all current or existing tasks, including the new task and enables an analysis of all active connections to determine the status of all current tasks and priorities. Given the current tasks, active connections, priorities, and throughput requirements, the monitoring blocks are queried to obtain the statistics for each radio (418). As illustrated in FIG. 3, Wi-Fi monitoring block 320, Bluetooth monitoring block 325, and Zigbee monitoring block 330 can be queried to obtain radio statistics for each corresponding radio.

The method also includes determining the appropriate duty cycle settings for each radio based on the current tasks, the active connections, the task priorities, and throughput requirements as illustrated in Table 2 below (420). This determination is typically made by the application framework, which maintains the list of active connections. In some embodiments, a determination is made of which of the cases included in the comprehensive list illustrated by Table 2 most closely matches the case associated with the current tasks and priorities (or most closely matching). In addition to setting of the Wi-Fi duty cycle, the Bluetooth schedule can be set or adjusted, and/or the Zigbee duty cycle can be set. As illustrated in Table 2, duty cycle values are provided for the Wi-Fi duty cycle indexed to the data rate. In some embodiments, the methods to set and adjust the Wi-Fi duty cycle are utilized first. Typically, control of the Wi-Fi duty cycle will achieve the desired system performance. If needed, the Bluetooth scheduling can be set and/or adjusted in addition to the Wi-Fi duty cycle. Finally, Zigbee duty cycle control is available if needed. Although all three radio controls are illustrated in Table 2, it is not necessary to utilize all the values provided, but they are provided to be utilized as appropriate. Moreover, although a prioritization of Wi-Fi, Bluetooth, and Zigbee is utilized in some embodiments, this is not required and other ordering of the radio control can be utilized. As will be evident to one of skill in the art, the ordering may be a function of the set of current tasks and active connections. If no Bluetooth connections are in use, but Zigbee sensors are active, then the order could be Wi-Fi followed by Zigbee. Similarly, if the only active connections are Wi-Fi and Bluetooth radios, adjustment of these radios is the relevant action.

In operation, control of the duty cycle of the radios will provide a predetermined number of time slots (i.e., receive slots) that are available for receipt of Zigbee packets. Through duty cycle control, transmission of the radios will be limited to specific time periods, resulting in idle periods during which signals for the other radios can be sent and received. Interactive control of the various radios is implemented in a manner such that requirements for each of the radios are met.

A decision is made, for example, by the task handler, as to whether one or more of the current tasks are critical or latency sensitive (422). If the task is critical or latency sensitive, then overrides are implemented by applying overrides to the Wi-Fi duty cycle (340) and/or the Zigbee duty cycle (370) in FIG. 3. These overrides can be generated by the application framework or the master duty cycle controller as appropriate. Similar to the order of radio setting/adjustment discussed above, typically, Wi-Fi duty cycle override will be applied first. As appropriate, Bluetooth and Zigbee radio control can be implemented subsequently. As mentioned above, the set of current tasks and active connections can impact this order, which will appropriately implement control suitable for the radios in operation.

For example, if a camera connected to the cloud senses motion, a lightbulb could be turned on to facilitate recording of the objects that triggered the motion sensor. In this case, turning on the lightbulb through Zigbee control would preferably be performed within a predetermined time period appropriate for the motion. Accordingly, turning on the lightbulb could be considered a task that is latency sensitive, resulting in a Zigbee override. As a default mode of operation, the override can be reset after accomplishment of the task, reset after a predetermined time period, or the like. The overrides can be predetermined based on use cases for the specific devices and accompanying tasks. In some implementations, the decision at block 422 can include an analysis of the task to be accomplished and the current duty cycle settings. Continuing with the example above, if turning on the lightbulb is to be accomplished in a predetermined time period (e.g., 100 ms) and the current radio duty cycle settings will result in a Zigbee packet being delivered to the lightbulb within the predetermined time period (e.g., 100 ms), then the task would not be latency sensitive since current system latencies are sufficient to accomplish the particular task. Accordingly, an override would not be applied.

In addition to information received from the cloud that can be used in making decision 422, other sources of information can be utilized. For example, connection information such as a notification that a device has dropped off the network can be used to determine that a task is critical. In the case of a lost connection, an override can be applied to communicate with the device that lost the connection. As another example, if a sensor that typically operates in a manner to periodically provide sensor data fails to provide the sensor data at the typical frequency, communication with the sensor can be initiated by application of an override. As another example, if Wi-Fi has lost connection to the home automation hub, the system priority could be to reestablish the Wi-Fi connection, regardless of the activity on the Bluetooth and Zigbee radios, resulting in application of a Wi-Fi override. As discussed above, radio control can be implemented through only Wi-Fi duty cycle control or a combination of Wi-Fi duty cycle control paired with control of the Bluetooth and/or Zigbee radios.

On the other hand, if the task is not critical or latency sensitive, control proceeds to the master duty cycle controller for implementation of duty cycle control (426) through Wi-Fi radio duty cycle control unit 350, Bluetooth radio duty cycle control unit 350, and/or Zigbee radio duty cycle control unit 350 as illustrated in FIG. 3.

According to an embodiment of the present disclosure, a computer-implemented method is provided. The method includes receiving, from an application framework, a set of tasks and a set of performance requirements for a radio network. A priority is associated with each task of the set of tasks and the radio network includes a Wi-Fi radio characterized by a Wi-Fi duty cycle and a Zigbee radio characterized by a Zigbee duty cycle. Each task of the set of tasks are associated with an electronic device.

The method also includes monitoring, using a monitoring unit, Wi-Fi radio metrics associated with the Wi-Fi radio (e.g., an average transmit throughput (i.e., the average data rate for transmission by the Wi-Fi radio), a transmit opportunity (i.e., a bounded time interval during which a radio can send as many frames as possible), or a ping latency (i.e., round trip time for a signal to return to originating radio) and Zigbee radio metrics associated with the Zigbee radio (e.g., a number of APS failures (i.e., the number of attempted APS messages for which an acknowledgement is not received in a specified time period), a number of APS retries (i.e., the number of APS messages that are resent after no acknowledgement is received), a mean latency (i.e., the mean of the time taken for the Zigbee network to wake up and respond during a predetermined time period), or a maximum latency (i.e., the maximum time taken for the Zigbee network to wake up and respond during a predetermined period)) and determining, using at least one of the Wi-Fi radio metrics or the Zigbee radio metrics, that performance of the radio network is below at least one of the set of performance requirements. As an example, if one or more of the Wi-Fi radio metrics are not compliant with at least one of a predetermined value or a range of predetermined values, it can be determined that the performance requirements are not being met. Furthermore, in relation to the Zigbee radio metrics, if it is determined that at least one of the Zigbee radio metrics is greater than or equal to a predetermined value (e.g., number of APS failures greater than a threshold or mean latency greater than a threshold), it can be concluded that the performance requirements are not being met. Accordingly, the method further includes modifying at least one of the Wi-Fi duty cycle or the Zigbee duty cycle.

As an example, modifying the Wi-Fi duty cycle can include a) setting the Wi-Fi radio to operate at the target Wi-Fi radio duty cycle setting and b) determining a measured Wi-Fi radio duty cycle. Utilizing an API, data related to the Wi-Fi radio performance, including a time period during which it is transmitting, a time period during which it was waiting to transmit, and the like can be obtained. This data, referred to as air time statistics, can then be used to determine the measured (i.e., actual) Wi-Fi radio duty cycle.

Modifying the Wi-Fi duty cycle can also include c) adjusting or setting at least one of a packet aggregation value or a packet length for the Wi-Fi radio and d) determining the measured Wi-Fi radio duty cycle. Modifying the Wi-Fi duty cycle can further include e) computing a difference between the measured duty cycle and the target Wi-Fi radio duty cycle setting and f) iteratively performing c) through e) until the difference is less than a threshold. It should be noted that modifying at least one of the Wi-Fi duty cycle or the Zigbee duty cycle can result in modification of both the Wi-Fi duty cycle and the Zigbee duty cycle concurrently.

In some implementations in addition to a Wi-Fi radio and a Zigbee radio, the radio network further includes a Bluetooth radio characterized by a Bluetooth duty cycle. In these implementations, the method includes monitoring, using the monitoring unit, Bluetooth radio metrics associated with the Bluetooth radio, determining, using the Bluetooth radio metrics that the performance of the radio network is below the at least one of the set of performance requirements, and modifying the Bluetooth duty cycle.

Additionally, the method can include monitoring, using the monitoring unit, at least one of the Wi-Fi radio metrics associated with the Wi-Fi radio or the Zigbee radio metrics associated with the Zigbee radio and determining, using the at least one of the Wi-Fi radio metrics or the Zigbee radio metrics, that performance of the radio network meets the at least one of the set of performance requirements.

Referring once again to a new task entering the application framework (410), according to a specific embodiment of the present disclosure, a computer-implemented method is provided. The method includes determining entry of a new task into an application framework of a radio network including a Wi-Fi radio. The application framework has a set of tasks and a priority associated with each task of the set of tasks. The method also includes initiating monitoring for the new task and obtaining data related to the new task and the set of tasks. The data includes performance metrics for the radio network. The method further includes determining a target Wi-Fi radio duty cycle setting for the Wi-Fi radio and initiating duty cycle control of the Wi-Fi radio.

Initiating duty cycle control of the Wi-Fi radio can include a) setting the Wi-Fi radio to operate at the target Wi-Fi radio duty cycle setting, b) determining a measured Wi-Fi radio duty cycle, and c) adjusting or setting at least one of a packet aggregation value or a packet length for the Wi-Fi radio. Initiating duty cycle control of the Wi-Fi radio can also include d) determining the measured Wi-Fi radio duty cycle, e) computing a difference between the measured duty cycle and the target Wi-Fi radio duty cycle setting, and f) iteratively performing c) through e) until the difference is less than a threshold. In some implementations, the radio network further includes a Bluetooth radio characterized by a Bluetooth duty cycle, and a Zigbee radio characterized by a Zigbee duty cycle. In these implementations, initiating duty cycle control of the Wi-Fi radio can include applying an override Wi-Fi radio duty cycle to the Wi-Fi radio.

FIG. 5 is a flowchart conceptually illustrating a method of controlling a Wi-Fi radio duty cycle according to examples of the present disclosure. The control of the Wi-Fi radio duty cycle is a dynamic process based, in part, on the Wi-Fi data transmission rate. Table 2 illustrates Wi-Fi data transmission rates for several Wi-Fi duty cycle cases. In addition to values for the Wi-Fi duty cycle, values for the Bluetooth schedule and the Zigbee duty cycle are illustrated.

TABLE 2

| Wi-Fi Data Rate (Mbps) | Case 1 | | | Case 2 | | |
| --- | --- | --- | --- | --- | --- | --- |
| | Wi-Fi Target DC | BT Target DC | Zigbee Target DC | Wi-Fi Target DC | BT Schedule | Zigbee Target DC |
| 1 | 25% | 30% | 45% | 15% | 50% | 35% |
| 2 | 25% | 30% | 45% | 15% | 50% | 35% |
| 5.5 | 25% | 30% | 45% | 15% | 50% | 35% |
| 6 | 25% | 30% | 45% | 20% | 50% | 30% |
| 9 | 25% | 30% | 45% | 20% | 50% | 30% |
| 12 | 30% | 30% | 40% | 25% | 50% | 25% |
| 18 | 30% | 30% | 40% | 25% | 50% | 25% |
| 24 | 30% | 30% | 40% | 25% | 50% | 25% |
| 36 | 35% | 30% | 35% | 30% | 50% | 20% |
| 48 | 35% | 30% | 35% | 30% | 50% | 20% |
| 54 | 35% | 30% | 35% | 30% | 50% | 20% |
| 65 | 35% | 30% | 35% | 30% | 50% | 20% |

As illustrated in Table 2, for each Wi-Fi data rate for communications with the access point (e.g., for 802.11n Wi-Fi networks), a duty cycle for the Wi-Fi radio can be assigned for a plurality of cases. The data in Table 2 is determined for specific cases of tasks and activities. It will be appreciated that the data rates and number of cases illustrated in Table 2 is merely exemplary and in actual implementation, additional data rates and additional cases will most likely be utilized.

As an example, Case 1 could be associated with a specific set of current tasks, active connections, priorities, and throughputs, for example, a speaker for audio streaming, a Bluetooth remote, and one ZigBee sensor. Case 2 in this example would be associated with a different set of current tasks, active connections, priorities, and/or throughputs, for example, the speaker for audio streaming, the Bluetooth remote, and five Zigbee sensors. In Case 2, the increased number of Zigbee sensors results in a lower duty cycle for the Wi-Fi radio to enable sufficient receive slots for the Zigbee packets. Since the Wi-Fi radio can be considered an aggressor and the Zigbee radio a victim, the Wi-Fi duty cycle is restricted to enable the Zigbee radio to achieve the desired Zigbee reliability. Although only two cases are illustrated in Table 2, multiple cases can be provided, each associated with a specific set of active connections, priorities, and throughputs.

For each case, the duty cycle of the Wi-Fi radio is determined for each Wi-Fi data transmission rate. In this example, Table 2, which can be stored as a lookup table, is indexed by data rate, with a duty cycle associated with the data rate for each case. The duty cycle data as a function of data rate and case represented by Table 2 can be generated in an offline characterization process as the operation and interaction of the various devices and active connections associated with each case are analyzed. The duty cycle data as a function of data rate and case can be stored in the firmware of the home automation hub, in the cloud, or the like. The duty cycle values in Table 2 provide a starting point or initialization value for the method illustrated in FIG. 5.

In defining a comprehensive data set as illustrated by Table 2, the supported use cases can be analyzed to define the various cases. In operation, a user will typically only utilize a subset of the available cases. Since the task manager has access to the list of current tasks and priorities, the case matching this list of current tasks and priorities (or most closely matching) will be selected from the comprehensive list.

Referring to FIG. 5, the method 500 includes initiating Wi-Fi duty cycle control (510). In order to set the duty cycle in a dynamic manner based on Wi-Fi transmission rates, the method includes obtaining a target Wi-Fi duty cycle, also referred to as a target duty cycle, based on the Wi-Fi transmission rate (512). Utilizing an API, for example, implemented using the monitoring unit, the Wi-Fi radio can be queried to obtain the current Wi-Fi transmission rate.

Using this target duty cycle, a command is sent to the Wi-Fi radio to set the Wi-Fi radio duty cycle at the target duty cycle (514). In one implementation, an API call can be used to pass the duty cycle data (determined as a function of data rate for a particular case as represented by the columns in Table 2) into the Wi-Fi radio. Accordingly, the target duty cycle for each data rate is made available to the Wi-Fi radio that is matched to the current tasks and priorities.

It should be noted that when a new task enters the application framework as discussed in relation to FIG. 4, the master duty cycle controller can be tasked with setting the Wi-Fi radio duty cycle at process 426. This, in turn will initiate Wi-Fi duty cycle control (510) and the addition of the new task may result in an updated target duty cycle as a function of transmission rate since the addition of the new task may have resulted in a shift to another column (a new case) as illustrated in Table 2. Accordingly, obtaining the target duty cycle can be performed repeatedly each time a new task enters the application framework, changes in the system characteristics occur, or the like.

As discussed in relation to Table 2, for each particular case, the characterization of the case yields a target duty cycle that is appropriate for the particular case. Although it would be desirable to set the Wi-Fi radio duty cycle at this target duty cycle rate, control of the Wi-Fi radio duty cycle is a coarse setting. As a result, although a request for a duty cycle of 30% is made, the actual Wi-Fi radio duty cycle may vary from the requested 30%.

Accordingly, given the target duty cycle, embodiments of the present disclosure fine tune the packet parameters to achieve the target duty cycle by adjusting the packet aggregation and packet size as described below.

The method includes monitoring air time statistics (516), which can be used to determine the actual duty cycle of not only the Wi-Fi radio, but the Bluetooth and Zigbee radios as well. For example, the Zigbee duty cycle can be monitored by examining the Zigbee requests that are received by the Wi-Fi radio, for instance, using the packet traffic arbitration (PTA) engine. In other words, the monitoring of the Zigbee requests can be used for a proxy for the time that should be allotted to Zigbee packets.

In some implementations, monitoring the air time statistics can include monitoring the length of time the radio is transmitting, the length of time the radio is receiving, and the length of time the radio is idle. Given the air time statistics, the measured (i.e., actual) Wi-Fi duty cycle is determined (516).

Given the measured Wi-Fi duty cycle, adjustment of the Wi-Fi radio duty cycle is performed (518), for example, by adjusting the Wi-Fi radio settings including packet aggregation and/or packet length. In some implementations, packet aggregation is adjusted first, followed by adjustment of the packet length. Reductions in the number of aggregated packets will be performed in these implementations until the number of aggregated packets is one. If additional adjustment is needed, the packet length can then be decreased until the target duty cycle is achieved.

Figure 6:
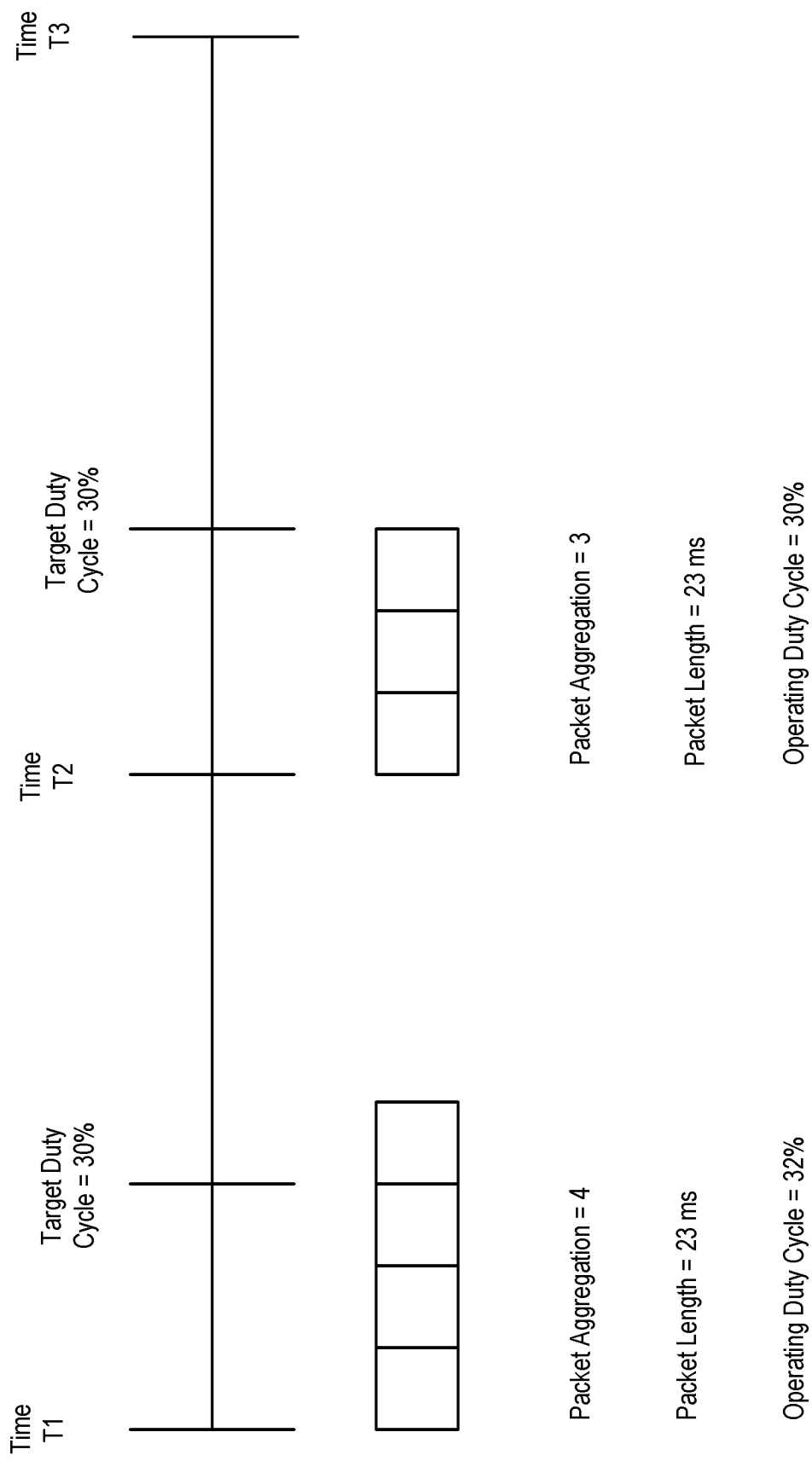
FIG. 6 is a timing diagram illustrating packet aggregation and packet length adjustment according to examples of the present disclosure.

FIG. 6 is a timing diagram illustrating packet aggregation and/or packet length adjustment according to examples of the present disclosure. Referring to FIG. 6, the target duty cycle is set at 30%, which could correspond to a data rate of 12 Mbps for Case 1. Initially, at time T1, based on a request for a target duty cycle of 30%, four packets are aggregated and the packet length is 23 ms. This combination of packet aggregation and packet length results in a measured Wi-Fi radio duty cycle of 32%, which is greater than target duty cycle of 30%. The measured Wi-Fi radio duty cycle, also referred to as the measured duty cycle or the actual duty cycle, can be determined through air time monitoring. In order to reduce the measured Wi-Fi radio duty cycle, at time T2, for example 100 ms after time T1, the number of aggregated packets is reduced from 4 to 3. This reduction in packet aggregation results in a measured Wi-Fi radio duty cycle of 30%, which is equal to the target duty cycle. Although in the embodiment illustrated in FIG. 6, a single iteration resulted in achieving the target duty cycle, additional iterations are utilized in other examples. Moreover, although the measured Wi-Fi radio duty cycle was 30% after the first iteration, the iteration can be repeated until the measured Wi-Fi radio duty cycle is within a predetermined threshold of the target duty cycle, for example, within 5%, 4%, 3%, 2%, 1%, 0.5%, or the like. As an example of reducing packet aggregation, for period of 23 ms, 11n MCS0 at a PHY rate of 12 Mbps, and an aggregation of 8 packets, the aggregated transmission period will be 11916.75 µs, which results in a duty cycle of 48%. By reducing the packet aggregation from 8 packets to 5 packets, the aggregated transmission time is reduced to 7444.219 µs, which results in a duty cycle of 30%.

In some implementations, predictive analysis is utilized in adjusting the duty cycle of the Wi-Fi radio. As an example, if a specific duty cycle has been applied before for a given data rate, resulting in specific settings of the aggregation and/or packet length to achieve the desired duty cycle, these specific setting can be retrieved from memory. Thus, the home automation device can learn as a function of time, thereby improving performance. In this case, processes 514 and 516 can be optional in a first pass, directly adjusting the Wi-Fi radio settings once the target Wi-Fi duty cycle is obtained in process 512.

As another example, data from various home automation hubs can be collected in the cloud (i.e., the specific Wi-Fi radio settings that achieved the target duty cycle) and machine learning techniques can be applied to determine the Wi-Fi radio settings that should be applied to achieve the desired duty cycle given the current tasks and priorities. For instance, if another home automation device in a similar use case achieved the target duty cycle using a set of packet aggregation and packet length settings, these settings could be utilized by a home automation device operating with the similar use case. Accordingly, utilizing these data sources, the target duty cycle can be achieved using a process characterized by rapid convergence.

After adjustment of the Wi-Fi radio settings, monitoring of the air time statistics and determination of the measured duty cycle is performed (520). Using the measured duty cycle, a determination is made of whether the target duty cycle has been achieved (522), which can include a difference between the target duty cycle and the measured duty cycle being less than a threshold. If the target duty cycle has been achieved, then the method loops to the monitoring process at 520. Monitoring will continue until the task handler initiates a new duty cycle control process. If the target duty cycle has not been achieved, then the method loops to adjustment of the Wi-Fi radio settings process at 518. Thus, an iterative loop is provided in which adjustment are made, the results are monitored, and the adjustment/monitoring process can be performed multiple times until the target duty cycle is achieved, which can include the measured Wi-Fi radio duty cycle being within a predetermined threshold of the target duty cycle.

The Wi-Fi duty cycle control loop will continue to operate until system changes are detected, as discussed in relation to FIG. 4. When the system environment changes and impacts system performance, the master duty cycle controller will reinitiate control of the one or more radios. As an example, if a new active connection is added, the duty cycle case in Table 2 can change, resulting in a new target Wi-Fi duty cycle. This change will result in re-initiation of Wi-Fi duty cycle control at 510 and corresponding adjustment and control of the duty cycle as illustrated in FIG. 5. As long as there are active connections, the various control loops are running, adjusting the radio operation. Referring to FIG. 5, after the target Wi-Fi radio duty cycle has been achieved, the process proceeds to process 418 in FIG. 4 and the monitoring blocks are queried to obtain the statistics for each radio.

It should also be noted that in some cases, if the target duty cycle is not achieved in a predetermined time period after Wi-Fi duty cycle control is initiated, then the master duty cycle controller can be notified to implement additional control. As an example, although Wi-Fi duty cycle control may typically produce the desired system performance, in some cases, it may be necessary to implement additional Bluetooth and/or Zigbee duty cycle control to meet system performance metrics. Moreover, the target Wi-Fi duty cycle may need to be updated, resulting in an updated target Wi-Fi duty cycle that can be implemented by re-initiating Wi-Fi duty cycle control.

Since the current link quality and the link quality target is known, the Wi-Fi packet characteristics can be adjusted while maintaining the link quality target. Accordingly, if the link quality exceeds the link quality target, then the Wi-Fi packet characteristics can be modified to provide additional receive slots for Zigbee packets. If, on the other hand, the link quality is below the link quality target, service can still be maintained to maintain the user experience.

In a particular embodiment, data collected from many devices can be analyzed in the cloud and used to define not only the target duty cycle as a function of case and transmission rate, but the Wi-Fi radio settings as a function of case and transmission rate. FIG. 7 is a flowchart conceptually illustrating a method of controlling a Wi-Fi radio duty cycle according to another example of the present disclosure. As illustrated in FIG. 7, Wi-Fi duty cycle control is initiated (710). The method also includes obtaining a target Wi-Fi duty cycle and Wi-Fi radio settings based on the Wi-Fi transmission rate (712). As discussed previously, data logging can be utilized to store and process historical data including the specific radio settings that achieved the target duty cycle for a given set of current tasks and priorities. In addition to storage on the home automation hub, this historical data can be stored in the cloud 150 and retrieved by the master duty cycle controller for use in implementing the duty cycle control of the various radios. Using this target duty cycle, an API call is utilized to set the Wi-Fi radio at the target duty cycle (714).

The Wi-Fi radio settings (e.g., packet aggregation and/or packet length) are applied to the Wi-Fi radio (716). The target duty cycle and the radio settings can be set concurrently. After application of the Wi-Fi radio settings, monitoring of the air time statistics and determination of the measured duty cycle is performed (718). Using the measured (i.e., actual) duty cycle, a determination is made of whether the target duty cycle has been achieved (720) (e.g., within a predetermined percentage). If the target duty cycle has been achieved, then the method loops to the monitoring process at 718. Monitoring will continue until the task handler initiates a new duty cycle control process. If the target duty cycle has not been achieved, then the method proceeds to adjustment of the Wi-Fi radio settings (722), which is performed in a manner similar to process 518. Thus, an iterative loop is provided in which adjustment are made, the results are monitored, and the adjustment/monitoring process can be performed multiple times until the target duty cycle is achieved.

Thus, by using information appropriate to the current tasks and priorities for a home automation hub, direct application of the Wi-Fi radio settings can be implemented to reduce the time and resources utilized in converging to the target duty cycle.

According to a particular embodiment of the present disclosure, a computer-implemented method is provided. The method includes a) receiving a Wi-Fi transmit rate for a Wi-Fi radio, b) receiving a target Wi-Fi radio duty cycle corresponding to the Wi-Fi transmit rate, and c) setting the Wi-Fi radio to operate at the target Wi-Fi radio duty cycle. Receiving the target Wi-Fi radio duty cycle can include accessing a lookup table including a plurality of different Wi-Fi radio duty cycles corresponding to the Wi-Fi radio transmit rate. The Wi-Fi radio duty cycle can be dependent on the number of tasks assigned to the Wi-Fi radio.

The method also includes d) determining a measured Wi-Fi radio duty cycle, e) adjusting or setting at least one of a packet aggregation value or a packet length for the Wi-Fi radio, and f) determining the measured Wi-Fi radio duty cycle. Determining the measured Wi-Fi radio duty cycle can include monitoring one or more metrics for the Wi-Fi radio. The one or more metrics can include an average transmit throughput, a transmit opportunity, or a ping latency. The target Wi-Fi radio duty cycle can be associated with a default packet aggregation value and adjusting the packet aggregation value can include adjusting the packet aggregation value to an adjusted packet aggregation value different from the default packet aggregation value. Moreover, the target Wi-Fi radio duty cycle can be associated with a default packet length and adjusting the packet length can include setting the packet length to an adjusted packet length different from the default packet length.

The method further includes g) computing a difference between the measured or actual duty cycle and the target Wi-Fi radio duty cycle and h) iteratively performing e) through g) until the difference is less than a threshold.

FIG. 8 is a flowchart conceptually illustrating a method of controlling Bluetooth radio duty cycle according to examples of the present disclosure. As illustrated in FIG. 3, the master duty cycle controller 230 is capable of implementing control of the Bluetooth radio duty cycle (355). Since Bluetooth is a schedule-based communications protocol, control of the Bluetooth radio duty cycle is performed to enable a sufficient number of receive slots for Zigbee packets in the Bluetooth schedule. If the master duty cycle controller determines that additional Zigbee receive slots are desired, Bluetooth duty cycle control can be initiated (810) and one of several optional adjustments to the Bluetooth radio.

One option for adjustment of the Bluetooth radio duty cycle is to adjust the scheduling for multi-profile scenarios (i.e., implementations in which multiple active connections are present) (812). This scheduling adjustment will allow sufficient time gaps in the Bluetooth radio transmissions for Zigbee packets to be received. As an example, a Bluetooth radio may be transmitting at 50% duty cycle. This duty cycle can be achieved with a small number of long duration packets or a larger number of shorter duration packets. The desired time gap between Bluetooth packets can be determined empirically to provide desired listening intervals for Zigbee packets. Accordingly, the Bluetooth schedule is set, for example, by using a counter to ensure that the desired time gap is present between the Bluetooth packets.

Another option for adjustment of the Bluetooth radio duty cycle is to temporarily drop low priority Bluetooth connections (814). The master duty cycle controller can prioritize the Bluetooth connections, for example, based on a time duration during which the connection has been idle, and then temporarily drop the low priority Bluetooth connections. If, after a predetermined time period, system performance allows the dropped connection to be reconnected, then the low priority Bluetooth connections can be reestablished. Reconnection can be initiated by the task handler after receipt of an indication (e.g., publishing of an intent) that the high priority task has been completed.

Figure 9:
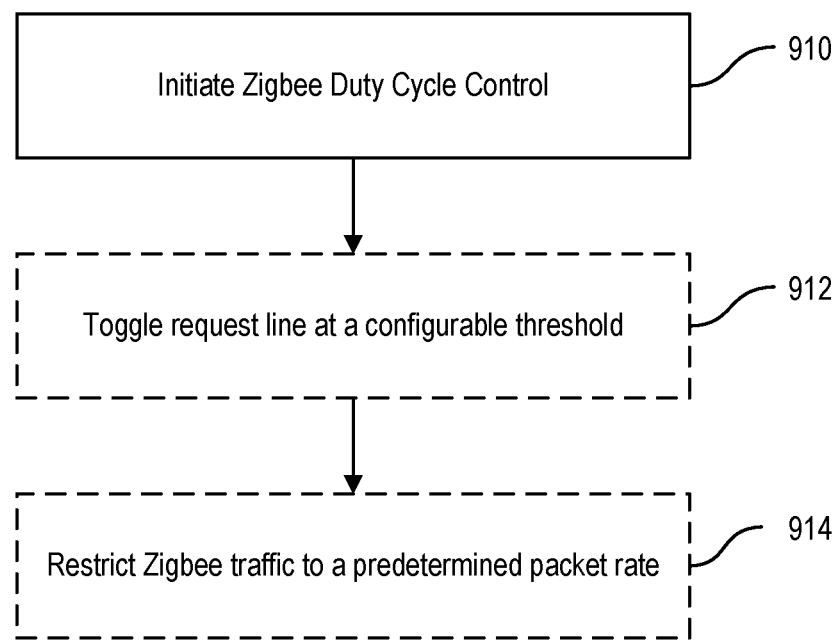
FIG. 9 is a flowchart conceptually illustrating a method of controlling Zigbee radio duty cycle according to examples of the present disclosure.

FIG. 9 is a flowchart conceptually illustrating a method of controlling Zigbee radio duty cycle according to examples of the present disclosure. In response to the application of override (370), Zigbee radio duty cycle control is initiated (910). As illustrated in FIG. 9, two optional methods can be utilized to adjust the Zigbee duty cycle.

One option for adjustment of the Zigbee radio duty cycle is to toggle the request line through the PTA engine at a configurable threshold, for example, 25% (912). The threshold can be configured based on the current tasks, active connections, and priorities as well as the network structure. This process will effectively pre-reserve air time (i.e., an additional overhead of air time) for Zigbee packets as a function of the percentage of time expected to be used by Zigbee packets.

Another option for adjustment of the Zigbee radio duty cycle is to adjust the Zigbee packet transmission rate (i.e., the number of Zigbee packets per second) to a predetermined rate, resulting in restriction of the Zigbee traffic to a predetermined packet rate (914). The predetermined rate is provided by the master duty cycle controller. Thus, processes for both increasing air time available to Zigbee packets (912), as well as processes for restricting Zigbee traffic (914) are provided by embodiment of the present disclosure.

Some or all of the processes 400, 500, 700, 800, or 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method implemented on a device, comprising:
   receiving, from an application framework of the device, a set of tasks, a throughput requirement for each task of the set of tasks, and information about a set of active connections, the set of tasks comprising a first task that uses a first radio of the device, the set of tasks further comprising a second task that uses a second radio of the device, the first radio being of a different type than the second radio;
   determining, using the set of tasks, the throughput requirement for each task of the set of tasks, and the set of active connections, a target radio duty cycle;
   setting the first radio to operate at the target radio duty cycle;
   monitoring, using a monitoring unit, air time statistics associated with the first radio;
   determining, using the air time statistics, a measured radio duty cycle; and
   adjusting radio settings of the first radio to decrease a difference between the target radio duty cycle and the measured radio duty cycle.

2. The computer-implemented method of claim 1, wherein the air time statistics associated with the first radio comprise at least one of a length of time the first radio is transmitting, a length of time the first radio is receiving, or a length of time the first radio is idle.

3. The computer-implemented method of claim 1, wherein the radio settings comprise a packet aggregation value or a packet length for the first radio.

4. The computer-implemented method of claim 1, further comprising prior to determining the target radio duty cycle, monitoring, using the monitoring unit, one or more radio metrics associated with the first radio.

5. The computer-implemented method of claim 1, further comprising:
   monitoring, using the monitoring unit, one or more radio metrics associated with the second radio;
   determining that at least one of the one or more radio metrics is greater than or equal to a predetermined value; and
   modifying a radio duty cycle of the second radio.

6. The computer-implemented method of claim 5, wherein the one or more radio metrics comprise a number of application support sub-layer (APS) failures, a number of APS retries, a mean latency, or a maximum latency.

7. The computer-implemented method of claim 5, wherein adjusting the radio settings of the first radio and modifying the radio duty cycle of the second radio are performed concurrently.

8. The computer-implemented method of claim 1,
   wherein the second radio comprises a Bluetooth radio characterized by a Bluetooth radio duty cycle; and
   wherein the computer-implemented method further comprises:
      monitoring, using the monitoring unit, one or more Bluetooth radio metrics associated with the Bluetooth radio;
      determining that at least one of the one or more Bluetooth radio metrics are greater than or equal to a predetermined value; and
      modifying the Bluetooth radio duty cycle.

9. The computer-implemented method of claim 1, wherein adjusting the radio settings comprises:
   a) decreasing at least one of a packet aggregation value or a packet length for the first radio;
   b) monitoring the air time statistics associated with the first radio;
   c) determining, using the air time statistics, the measured radio duty cycle;
   d) computing the difference between the target radio duty cycle and the measured radio duty cycle; and
   e) iteratively performing a) through d) until the difference is less than a threshold.

10. The computer-implemented method of claim 1, further comprising:
    monitoring one or more metrics for the first radio;
    determining that at least one of the one or more metrics is not compliant with at least one of a predetermined value or a range of predetermined values; and
    repeating:
       receiving, from the application framework, the set of tasks, the throughput requirement for each task of the set of tasks, and the set of active connections;
       determining the target radio duty cycle; and
       setting the first radio to operate at the target radio duty cycle.

11. The computer-implemented method of claim 10, wherein the one or more metrics for the first radio comprise an average transmit throughput, a transmit opportunity, or a ping latency.

12. The computer-implemented method of claim 1, wherein determining the target radio duty cycle comprises determining, by the application framework from a data structure, the information about the set of active connections, second information about the set of tasks, and third information about the throughput requirement, and wherein the data structure associates the information, the second information, and the third information with the target radio duty cycle.

13. A computer-implemented method, comprising:
    a) receiving a transmit rate for a task that uses a first radio from a plurality of different types of radios of a device;
    b) receiving, based at least in part on the task and a set of active connections of the device, a target radio duty cycle corresponding to the transmit rate;
    c) setting the first radio to operate at the target radio duty cycle;
    d) determining a measured radio duty cycle;
    e) adjusting at least one of a packet aggregation value or a packet length for the first radio;
    f) determining the measured radio duty cycle;
    g) computing a difference between the measured radio duty cycle and the target radio duty cycle; and
    h) iteratively performing e) through g) until the difference is less than a threshold.

14. The computer-implemented method of claim 13, wherein the target radio duty cycle is dependent on a number of tasks assigned to the first radio or is a function of a desired throughput rate divided by a data rate of the first radio.

15. The computer-implemented method of claim 13, wherein receiving the target radio duty cycle comprises accessing a lookup table including a plurality of different radio duty cycles corresponding to the transmit rate.

16. The computer-implemented method of claim 13, wherein the target radio duty cycle is associated with a default packet aggregation value and adjusting the packet aggregation value comprises setting the packet aggregation value to an adjusted packet aggregation value different from the default packet aggregation value.

17. The computer-implemented method of claim 13, wherein the target radio duty cycle is associated with a default packet length and adjusting the packet length comprises setting the packet length to an adjusted packet length different from the default packet length.

18. A system comprising:
   a processor;
   a first radio coupled to the processor;
   a second radio coupled to the processor;
   a third radio coupled to the processor, wherein the first radio, the second radio, and the third radio form a radio network, and wherein at least the first radio is of a different type than the second radio; and
   a non-transitory computer-readable storage medium coupled to the processor and comprising a plurality of computer-readable instructions tangibly embodied on the non-transitory computer-readable storage medium, which, when executed by the processor, initiate duty cycle control of the first radio, the plurality of computer-readable instructions comprising:
      instructions that cause the processor to determine addition of a new task to a set of existing tasks;
      instructions that cause the processor to initiate monitoring for the new task;
      instructions that cause the processor to obtain data related to the new task and the set of existing tasks, the data indicating a throughput requirement for a task that uses the first radio and a set of active connections of the radio network;
      instructions that cause the processor to determine, based at least in part on the data, a target radio duty cycle setting for the first radio; and
      instructions that cause the processor to initiate duty cycle control of the first radio, the duty cycle control comprising an adjustment to a setting of the first radio.

19. The system of claim 18, wherein the instructions that cause the processor to initiate duty cycle control of the first radio comprises:
   a) instructions that cause the processor to set the first radio to operate at the target radio duty cycle setting;
   b) instructions that cause the processor to determine a measured radio duty cycle;
   c) instructions that cause the processor to adjust at least one of a packet aggregation value or a packet length for the first radio;
   d) instructions that cause the processor to determine the measured radio duty cycle;
   e) instructions that cause the processor to compute a difference between the measured radio duty cycle and the target radio duty cycle setting; and
   f) instructions that cause the processor to iteratively perform c) through e) until the difference is less than a threshold.

20. The system of claim 18, wherein the instructions that cause the processor to initiate duty cycle control of the first radio comprises instructions that cause the processor to apply an override radio duty cycle to the first radio.

* * * * *